(12) United States Patent
Iizuka et al.

(10) Patent No.: US 11,926,694 B2
(45) Date of Patent: Mar. 12, 2024

(54) METHOD FOR PRODUCING AQUEOUS CARBODIIMIDE-CONTAINING LIQUID

(71) Applicant: NISSHINBO CHEMICAL INC., Tokyo (JP)

(72) Inventors: Shunsuke Iizuka, Chiba (JP); Kenichi Yanagisawa, Chiba (JP)

(73) Assignee: NISSHINBO CHEMICAL INC., Tokyo (JP)

(*) Notice: Subject to any disclaimer, the term of this patent is extended or adjusted under 35 U.S.C. 154(b) by 877 days.

(21) Appl. No.: 16/970,831

(22) PCT Filed: Jan. 18, 2019

(86) PCT No.: PCT/JP2019/001372
§ 371 (c)(1),
(2) Date: Aug. 18, 2020

(87) PCT Pub. No.: WO2019/163345
PCT Pub. Date: Aug. 29, 2019

(65) Prior Publication Data
US 2020/0377645 A1    Dec. 3, 2020

(30) Foreign Application Priority Data

Feb. 23, 2018  (JP) ................................ 2018-031209

(51) Int. Cl.
| | | |
|---|---|---|
| C09D 11/00 | (2014.01) | |
| C08G 18/80 | (2006.01) | |
| C09D 11/102 | (2014.01) | |
| C09D 175/08 | (2006.01) | |

(52) U.S. Cl.
CPC ....... *C08G 18/8003* (2013.01); *C08G 18/808* (2013.01); *C09D 11/102* (2013.01); *C09D 175/08* (2013.01)

(58) Field of Classification Search
CPC .................. C08G 18/8003; C08G 18/808; C09D 11/102; C09D 175/08
USPC .......................................... 106/31.01, 31.13
See application file for complete search history.

(56) References Cited

U.S. PATENT DOCUMENTS

| | | |
|---|---|---|
| 5,126,479 A | 6/1992 | Dünwald et al. |
| 5,821,325 A | 10/1998 | Yahata et al. |
| 6,124,398 A | 9/2000 | Imashiro et al. |
| 2006/0106189 A1 | 5/2006 | Hesselmans et al. |
| 2010/0076153 A1 | 3/2010 | Hesselmans et al. |
| 2010/0105797 A1 | 4/2010 | Hiraiwa et al. |
| 2011/0018363 A1 | 1/2011 | So |
| 2015/0259485 A1 | 9/2015 | Burckhardt et al. |

FOREIGN PATENT DOCUMENTS

| | | |
|---|---|---|
| CN | 101374876 A | 2/2009 |
| CN | 104640894 A | 5/2015 |
| EP | 0 850 985 A1 | 7/1998 |
| EP | 3 321 299 A1 | 5/2018 |
| JP | 9-216831 A | 8/1997 |
| JP | 9-221532 A | 8/1997 |
| JP | 10-182990 A | 7/1998 |
| JP | H10182990 A * | 7/1998 |
| JP | 2000-319351 A | 11/2000 |
| JP | 2004-256505 A | 9/2004 |
| JP | 2009-132762 A | 6/2009 |
| JP | 2011-25221 A | 2/2011 |
| JP | 2011-252121 A | 12/2011 |
| JP | 2018-9192 A | 1/2018 |
| WO | WO 2005/003204 A2 | 1/2005 |

OTHER PUBLICATIONS

International Search Report (PCT/ISA/210) issued in PCT/JP2019/001372 dated Mar. 12, 2019.
Chinese Office Action and Search Report for Chinese Application No. 201980014339.8, dated Sep. 27, 2021.
Extended European Search Report for European Application No. 19758309.9, dated Oct. 12, 2021.

\* cited by examiner

*Primary Examiner* — James E Mcdonough
(74) *Attorney, Agent, or Firm* — Birch, Stewart, Kolasch & Birch, LLP

(57) ABSTRACT

The present invention provides a method for producing an aqueous carbodiimide having excellent crosslinking reactivity with a crosslinking group, such as an alcoholic hydroxy group of an aqueous resin. The method for producing an aqueous carbodiimide-containing liquid includes a step (1) of mixing an isocyanate group-containing carbodiimide (A), a terminal blocking agent, and at least one organic metal compound selected from an organic titanium compound, an organic zirconium compound, and an organic aluminum compound and allowing them to react with each other, to obtain a terminal-blocked carbodiimide (B) in which the isocyanate group is blocked with the terminal blocking agent; and a step (2) of dissolving or dispersing the terminal-blocked carbodiimide (B) in an aqueous solvent, to obtain an aqueous carbodiimide-containing liquid, wherein the terminal blocking agent contains a hydrophilic compound (X) having a functional group having reactivity with the isocyanate group and a hydrophilic group other than the functional group.

15 Claims, No Drawings

METHOD FOR PRODUCING AQUEOUS CARBODIIMIDE-CONTAINING LIQUID

TECHNICAL FIELD

The present invention relates to a method for producing an aqueous carbodiimide-containing liquid which can be suitably used as a crosslinking agent for aqueous resins, such as aqueous paints and inks.

BACKGROUND ART

An aqueous resin having water solubility or water dispersibility is used for various applications, such as paints, inks, fiber processing agents, adhesives, and coating agents, because of excellent handling properties from the standpoint of environment and safety. As for the aqueous resin, in order to give water solubility or water dispersibility to the resin itself, a hydrophilic group, such as a hydroxy group and a carboxy group, is introduced. Therefore, the aqueous resin is liable to be inferior in water resistance or durability to an oily resin.

For that reason, in order to improve various physical properties of an aqueous resin, such as water resistance, durability, and strength, a crosslinking agent is added in the foregoing aqueous resin.

As one of such crosslinking agents, a carbodiimide compound is known. For example, PTLs 1 and 2 describe that by allowing a polycarbodiimide crosslinking agent to react with a compound having a hydroxy group or a mercapto group in the presence of an alcoholate (alkoxide) of an alkali metal or alkaline earth metal, a crosslinking reaction by a carbodiimide group is promoted.

In addition, PTLs 3 and 4 propose, as a crosslinking agent that is hardly hydrolyzed, an aqueous titanium composition composed of a titanium alkoxide or a titanium chelate compound, an amine compound, and a glycol compound.

CITATION LIST

Patent Literature

PTL 1: JP 9-221532 A
PTL 2: JP 9-216931 A
PTL 3: JP 2004-256505 A
PTL 4: JP 2009-132762 A

SUMMARY OF INVENTION

Technical Problem

However, in the aforementioned PTLs 1 and 2, an aqueous carbodiimide is not used as the polycarbodiimide crosslinking agent. In addition, the alkali metal or alkaline earth metal is used as the metal of the metal alkoxide, such is easily hydrolyzed, and the reaction system becomes strongly alkaline, so that it is not preferred from the standpoint of safety at the time of handling. For this reason, it is hardly said that crosslinking by the methods described in PTLs 1 and 2 is adaptive to the aqueous resin.

Meanwhile, the aqueous titanium compositions described in the aforementioned PTLs 3 and 4 contain the amine compound as an essential component but are not one containing, as the component, a carbodiimide compound. When a carbodiimide group-containing component is mixed with the foregoing aqueous titanium composition, an amine and a carbodiimide group readily react with each other, whereby a crosslinking-reactive functional group (crosslinking group) is decreased.

In addition, the conventional aqueous carbodiimide is low in reactivity with an alcoholic hydroxy group, so that there was involved such a problem that the crosslinking reaction does not thoroughly proceed relative to an aqueous resin having a high content proportion of the alcoholic hydroxy group.

Under these circumstances, in order to improve the crosslinking reactivity of the aqueous carbodiimide, the present inventors made extensive and intensive investigations. As a result, it has been found that on the occasion of producing the aqueous carbodiimide, by adding a predetermined organic metal compound, an aqueous carbodiimide having excellent crosslinking reactivity is obtained.

The present invention has been made on the basis of such a finding, and an object thereof is to provide a method for producing an aqueous carbodiimide-containing liquid having excellent crosslinking reactivity with a crosslinking group, such as an alcoholic hydroxy group of an aqueous resin.

Solution to Problem

The present invention is based on such a finding that on the occasion of producing an aqueous carbodiimide, the addition of a predetermined organic metal compound is effective for obtaining an aqueous carbodiimide having favorable reactivity with a crosslinking group, such as an alcoholic hydroxy group of an aqueous resin.

Specifically, the present invention provides the following [1] to [15].

[1] A method for producing an aqueous carbodiimide-containing liquid, including a step (1) of mixing an isocyanate group-containing carbodiimide (A), a terminal blocking agent, and at least one organic metal compound selected from an organic titanium compound, an organic zirconium compound, and an organic aluminum compound and allowing them to react with each other, to obtain a terminal-blocked carbodiimide (B) in which the isocyanate group is blocked with the terminal blocking agent; and a step (2) of dissolving or dispersing the terminal-blocked carbodiimide (B) in an aqueous solvent, to obtain an aqueous carbodiimide-containing liquid, wherein the terminal blocking agent contains a hydrophilic compound (X) having a functional group having reactivity with the isocyanate group and a hydrophilic group other than the functional group.

[2] The method for producing an aqueous carbodiimide-containing liquid as set forth in the above [1], wherein the addition amount of the organic metal compound is 0.0005 to 15 parts by mass as expressed in terms of an amount of metal element contained based on 100 parts by mass of the isocyanate group-containing carbodiimide (A).

[3] The method for producing an aqueous carbodiimide-containing liquid as set forth in the above [1], wherein in the step (1), a polyisocyanate and a carbodiimidation catalyst are used in place of the isocyanate group-containing carbodiimide (A).

[4] The method for producing an aqueous carbodiimide-containing liquid as set forth in the above [3], wherein after mixing the polyisocyanate and the carbodiimidation catalyst and allowing them to react with each other, the terminal blocking agent and the organic metal compound are added and mixed.

[5] The method for producing an aqueous carbodiimide-containing liquid as set forth in the above [3], wherein after mixing the polyisocyanate, the carbodiimidation catalyst, and the organic metal compound and allowing them to react with each other, the terminal blocking agent is added and mixed.

[6] The method for producing an aqueous carbodiimide-containing liquid as set forth in the above [3], wherein the polyisocyanate, the carbodiimidation catalyst, the terminal blocking agent, and the organic metal compound are simultaneously mixed and allowed to react with each other.

[7] The method for producing an aqueous carbodiimide-containing liquid as set forth in the above [3], wherein after mixing the polyisocyanate, the terminal blocking agent, and the organic metal compound and allowing them to react with each other, the carbodiimidation catalyst is added and mixed.

[8] The method for producing an aqueous carbodiimide-containing liquid as set forth in the above [3], wherein after mixing the polyisocyanate and the terminal blocking agent and allowing them to react with each other, the carbodiimidation catalyst and the organic metal compound are added and mixed.

[9] The method for producing an aqueous carbodiimide-containing liquid as set forth in any one of the above [3] to [8], wherein the polyisocyanate is at least one selected from tetramethylene diisocyanate, hexamethylene diisocyanate, dodecamethylene diisocyanate, 2,2,4-trimethylhexamethylene diisocyanate, 1,4-bis(isocyanatomethyl)cyclohexane, 2,2-bis(4-isocyanatocyclohexyl)propane, isophorone diisocyanate, 4,4'-dicyclohexylmethane diisocyanate, 1,3-bis(2-isocyanato-2-propyl)benzene, toluene-2,4-diisocyanate, 2,2'-diphenylmethane diisocyanate, 2,4'-diphenylmethane diisocyanate, 4,4'-diphenylmethane diisocyanate, 2,4,6-triisopropylbenzene-1,3-diyl diisocyanate, triphenylmethane triisocyanate, biphenyl-2,4,4'-triisocyanate, and 1,6,11-undecane triisocyanate.

[10] The method for producing an aqueous carbodiimide-containing liquid as set forth in any one of the above [3] to [9], wherein the addition amount of the organic metal compound is 0.0005 to 15 parts by mass as expressed in terms of an amount of metal element contained based on 100 parts by mass of the polyisocyanate.

[11] The method for producing an aqueous carbodiimide-containing liquid as set forth in any one of the above [1] to [10], wherein in the terminal-blocked carbodiimide (B), all of the terminal isocyanate groups are blocked with the hydrophilic compound (X).

[12] The method for producing an aqueous carbodiimide-containing liquid as set forth in any one of the above [1] to [10], wherein the terminal-blocked carbodiimide (B) contains one in which one or more of the terminal isocyanate groups in one molecule are blocked with the hydrophilic compound (X), and one or more of the remaining isocyanate groups are blocked with a compound other than the hydrophilic compound (X).

[13] The method for producing an aqueous carbodiimide-containing liquid as set forth in any one of the above [1] to [12], wherein the organic metal compound is a metal alkoxide represented by any of the following general formulae (1-1) to (1-3):

$$Ti(OR)_4 \quad (1\text{-}1)$$

$$Zr(OR)_4 \quad (1\text{-}2)$$

$$Al(OR)_3 \quad (1\text{-}3)$$

wherein R's are each independently an alkyl group having 1 to 20 carbon atoms.

[14] The method for producing an aqueous carbodiimide-containing liquid as set forth in any one of the above [1] to [13], wherein the hydrophilic compound (X) is a polyalkylene glycol monohydrocarbyl ether.

[15] The method for producing an aqueous carbodiimide-containing liquid as set forth in any one of the above [1] to [14], wherein a reaction temperature in the step (1) is 20 to 200° C.

Advantageous Effects of Invention

In accordance with the present invention, an aqueous carbodiimide-containing liquid having excellent crosslinking reactivity with a crosslinking group, such as an alcoholic hydroxy group of an aqueous resin, is obtained.

In consequence, the aqueous carbodiimide-containing liquid which is obtained by the production method of the present invention can be suitably used as a crosslinking agent for aqueous resins.

DESCRIPTION OF EMBODIMENTS

The method for producing an aqueous carbodiimide-containing liquid of the present invention is hereunder described in detail.

The method for producing an aqueous carbodiimide-containing liquid of the present invention includes a step (1) of mixing an isocyanate group-containing carbodiimide (A), a terminal blocking agent, and at least one organic metal compound selected from an organic titanium compound, an organic zirconium compound, and an organic aluminum compound and allowing them to react with each other, to obtain a terminal-blocked carbodiimide (B) in which the isocyanate group is blocked with the terminal blocking agent; and a step (2) of dissolving or dispersing the terminal-blocked carbodiimide (B) in an aqueous solvent, to obtain an aqueous carbodiimide-containing liquid. The present invention is characterized in that the terminal blocking agent contains a hydrophilic compound (X) having a functional group having reactivity with the isocyanate group and a hydrophilic group other than the functional group.

In view of the fact that the organic metal compound is used, a blocking reaction owing to the terminal blocking agent containing the hydrophilic compound (X) is promoted, and the aqueous carbodiimide-containing liquid that is suitable as the crosslinking agent for aqueous resins can be obtained in a state of being dissolved or dispersed in an aqueous solvent.

[Aqueous Carbodiimide]

The aqueous carbodiimide of the present invention is a compound having one or more carbodiimide groups, and it may be one kind of a compound or may be a mixture containing two or more compounds. A "polymerization degree" with respect to the carbodiimide refers to the number of carbodiimide groups derived from a decarboxylation condensation reaction of the polyisocyanate compound in the carbodiimide. The polymerization degree is appropriately set according to various characteristics required for aqueous resins to which the aqueous carbodiimide is added, and it is typically 1 to 20, preferably 2 to 15, and more preferably 3 to 10. A compound having two or more carbodiimide groups is also called a polycarbodiimide.

The term "aqueous" as referred to in the present invention means that the compound has solubility or dispersibility relative to an aqueous solvent. The aqueous solvent refers to water or a hydrophilic solvent selected from an alcohol, an ether, a ketone, an ester, and so on, or a mixed solvent thereof.

[Step (1)]

In the step (1), an isocyanate group-containing carbodiimide (A), a terminal blocking agent, and at least one organic metal compound selected from an organic titanium compound, an organic zirconium compound, and an organic aluminum compound are mixed and allowed to react with each other, to obtain a terminal-blocked carbodiimide (B) in which the isocyanate group is blocked with the terminal blocking agent. That is, the step (1) is a terminal blocking step of the isocyanate group-containing carbodiimide (A).

As for the respective reaction raw materials for obtaining the terminal-blocked carbodiimide (B) to be mixed in the step (1), it does not matter the addition order thereof, and these reaction raw materials may be simultaneously added or may be successively added.

(Isocyanate Group-Containing Carbodiimide (A))

The "isocyanate group-containing carbodiimide" as referred to in the present invention is a compound having an isocyanate group and a carbodiimide group. The number of isocyanate groups in one molecule of the isocyanate group-containing carbodiimide (A) is preferably 1 to 3, and more preferably 1 to 2. In addition, the number of carbodiimide groups in one molecule of the isocyanate group-containing carbodiimide (A) is preferably 1 to 20, and from the viewpoint of obtaining an aqueous carbodiimide having excellent crosslinking reactivity, it is more preferably 2 to 15, and still more preferably 3 to 10.

As the isocyanate group-containing carbodiimide (A), for example, a carbodiimide having an isocyanate group at a terminal thereof, which is obtained through a decarboxylation condensation reaction of a polyisocyanate, can be used.

[Steps (1A) to (1E)]

In the step (1), a polyisocyanate and a carbodiimidation catalyst may be used in place of the isocyanate group-containing carbodiimide (A). Specifically, in place of this, the step (1) can be performed by any one of the following steps (1A) to (1E) according to the addition and mixing order of the reaction raw materials.

<Step (1A)>

After mixing the polyisocyanate and the carbodiimidation catalyst and allowing them to react with each other, the terminal blocking agent and the organic metal compound are added and mixed, to obtain the terminal-blocked carbodiimide (B).

<Step (1B)>

After mixing the polyisocyanate, the carbodiimidation catalyst, and the organic metal compound and allowing them to react with each other, the terminal blocking agent is added and mixed, to obtain the terminal-blocked carbodiimide (B).

<Step (1C)>

The polyisocyanate, the carbodiimidation catalyst, the terminal blocking agent, and the organic metal compound are simultaneously mixed and allowed to react with each other, to obtain the terminal-blocked carbodiimide (B).

<Step (1D)>

After mixing the polyisocyanate, the terminal blocking agent, and the organic metal compound and allowing them to react with each other, the carbodiimidation catalyst is added and mixed, to obtain the terminal-blocked carbodiimide (B).

<Step (1E)>

After mixing the polyisocyanate and the terminal blocking agent and allowing them to react with each other, the carbodiimidation catalyst and the organic metal compound are added and mixed, to obtain the terminal-blocked carbodiimide (B).

The steps (1A) to (1E) can be arbitrarily selected. However, in the case where after the carbodiimidation reaction of the polyisocyanate, the terminal blocking reaction is performed in the presence of the organic metal compound, it is easy to control the polymerization degree or terminal blocking of the terminal-blocked carbodiimide (B). In addition, in the case where the terminal blocking reaction is performed in advance, a reaction time tends to become long. For this reason, from the viewpoint of production optimization and reaction stability, and so on, the steps (1A) and (1B) are more preferred than the steps (1D) and (1E).

(Polyisocyanate)

The polyisocyanate is a compound having two or more isocyanate groups. Although the polyisocyanate which is used in the present invention is not particularly limited, in general, a diisocyanate having two isocyanate groups or a triisocyanate having three isocyanate groups is suitably used. In addition, all of an aliphatic (linear) polyisocyanate, an alicyclic polyisocyanate, an aromatic polyisocyanate, and a heterocyclic polyisocyanate may be used, and these may be used alone or may be used in combination of two or more thereof.

Specifically, examples thereof include aliphatic (linear) polyisocyanates, such as tetramethylene diisocyanate, hexamethylene diisocyanate, dodecamethylene diisocyanate, 2,2,4-trimethylhexamethylene diisocyanate, and 1,6,11-undecane triisocyanate; alicyclic polyisocyanates, such as 1,4-bis(isocyanatomethyl)cyclohexane, 2,2-bis(4-isocyanatocyclohexyl)propane, isophorone diisocyanate, and dicyclohexylmethane-4,4'-diisocyanate; an aromatic ring-containing aliphatic polyisocyanates, such as 1,3-bis(2-isocyanato-2-propyl)benzene; and aromatic polyisocyanates, such as toluene-2,4-diisocyanate, 2,2'-diphenylmethane diisocyanate, 2,4'-diphenylmethane diisocyanate, 4,4'-diphenylmethane diisocyanate, 2,4,6-triisopropylbenzene-1,3-diyl diisocyanate, triphenylmethane triisocyanate, and biphenyl-2,4,4'-triisocyanate. Of these, from the viewpoint of easiness of synthesis of the carbodiimide and storage stability of the synthesized carbodiimide, dicyclohexylmethane-4,4'-diisocyanate and 1,3-bis(2-isocyanato-2-propyl) benzene are suitably used; and from the viewpoint of easiness of availability and so on, dicyclohexylmethane-4, 4'-diisocyanate is more suitably used.

(Carbodiimidation Catalyst)

The carbodiimidation catalyst has an action to promote the decarboxylation condensation reaction of the polyisocyanate. The carbodiimidation catalyst is not particularly limited, and a known material can be used. Examples thereof include organic phosphorus compounds, such as a phospholene compound and a phosphoric acid ester compound; and organic metal compounds, such as a metal carbonyl complex and a metal acetyl acetone complex. Specifically, examples thereof include 1-phenyl-2-phospholene-1-oxide, 3-methyl-2-phospholene-1-oxide, 1-ethyl-2-phospholene-1-oxide, 3-methyl-1-phenyl-2-phospholene-1-oxide, and 3-phospholene isomers thereof. Of these, 3-methyl-1-phenyl-2-phospholene-1-oxide is suitably used from the viewpoint of catalytic activity and costs, and so on.

The addition amount of the carbodiimidation catalyst is a general catalyst quantity to an extent that the carbodiimidation reaction can be promoted and is appropriately adjusted according to the desired polymerization degree of the carbodiimide. The foregoing addition amount is typically 0.01 to 2.0 parts by mass based on 100 parts by mass of the polyisocyanate.

(Terminal Blocking Agent)

The terminal blocking agent plays a role in reacting with the isocyanate group to block the terminal isocyanate group of the carbodiimide. The terminal blocking agent which is used in the present invention contains a hydrophilic compound (X) having a functional group having reactivity with the isocyanate group and a hydrophilic group other than the functional group in order to block the terminal isocyanate group. The terminal blocking agent containing the hydrophilic compound (X) having such a hydrophilic group is able to give a terminal structure in which the terminal-blocked carbodiimide (B) becomes aqueous owing to the aforementioned hydrophilic group.

The hydrophilic compound (X) may be used alone or may be used in admixture of two or more thereof.

The terminal blocking agent is added in an amount such that all of the terminal isocyanate groups of the carbodiimide are blocked, and as the addition amount thereof, in the step (1), the terminal blocking agent is typically added in an amount of 1.0 to 1.5 mols per mol of the isocyanate group of the isocyanate group-containing carbodiimide (A).

In the steps (1A) to (1E), the addition amount of the terminal blocking agent is appropriately adjusted according to the number of isocyanate groups of the polyisocyanate and the polymerization degree of the carbodiimide, and so on.

In order to make the terminal-blocked carbodiimide (B) have favorable water solubility or water dispersibility, it is preferred that all of the terminal isocyanate groups thereof are blocked with the hydrophilic compound (X). That is, it is preferred that the terminal blocking agent is composed of only the hydrophilic compound (X).

So long as the terminal-blocked carbodiimide (B) is obtained as the aqueous carbodiimide, it may be an embodiment in which all of the terminal isocyanate groups thereof are not blocked with the hydrophilic compound (X), and it may contain one in which one or more of the terminal isocyanate groups in one molecule are blocked with the hydrophilic compound (X), and one or more of the remaining isocyanate groups are blocked with a compound other than the hydrophilic compound (X). That is, the terminal blocking agent may contain a compound having a functional group capable of blocking the isocyanate group, other than the hydrophilic compound (X). The aforementioned compound is, for example, preferably a low-molecular compound not having a hydrophilic group exclusive of a functional group having reactivity with the isocyanate group and having a molecular weight of 300 or less from the viewpoint that the terminal-blocked carbodiimide (B) forms a firm micelle in an aqueous medium, to exhibit favorable water dispersibility. Specifically, the aforementioned compound is preferably a monoalcohol, a monocarboxylic acid, a monoamine, a monoisocyanate, or the like of a hydrocarbon compound. It does not matter whether or not the aforementioned compound is hydrophilic.

In the case where the terminal blocking agent also contains other compound than the hydrophilic compound (X), the content of the hydrophilic compound (X) in the terminal blocking agent is defined as one falling within a range where the terminal-blocked carbodiimide (B) is obtained as the aqueous carbodiimide, and it is preferably 50 mol % or more, more preferably 80 mol % or more, and still more preferably 90 mol % or more in 100 mol % of the terminal blocking agent.

In the case where the terminal blocking agent is a mixture of two or more compounds, it does not matter the addition order thereof, and these compounds may be simultaneously added or may be successively added.

Examples of the functional group having reactivity with the isocyanate group include a hydroxy group, a carboxy group, an amino group, and an isocyanate group. In the case of a hydroxy group, the terminal is blocked through urethanation of the terminal isocyanate group. In the case of a carboxy group, the terminal is blocked through amidation of the terminal isocyanate group. In the case of an amino group, the terminal is blocked through urea formation of the terminal isocyanate group. In the case of an isocyanate group, the terminal is blocked through carbodiimidation of the terminal isocyanate group.

The aforementioned hydrophilic group is a group other than the functional group having reactivity with the isocyanate group, and examples thereof include a polyoxyalkylene group.

The hydrophilic compound (X) is preferably a polyalkylene glycol monohydrocarbyl ether represented by the following general formula (2).

$$R^1(OCHR^2CH_2)_nOH \qquad (2)$$

In the formula (2), $R^1$ is an alkyl group having 1 to 4 carbon atoms or a phenyl group, preferably a methyl group or an ethyl group, and more preferably a methyl group; $R^2$ is a hydrogen atom or an alkyl group having 1 to 4 carbon atoms, preferably a hydrogen atom or a methyl group, and more preferably a hydrogen atom; and n is an integer of 4 to 45, preferably 5 to 30, and more preferably 6 to 15.

Of these, a polyalkylene glycol monoalkyl ether is preferred. Specifically, examples thereof include polyethylene glycol monomethyl ether and polyethylene glycol monoethyl ether, and in particular, polyethylene glycol monomethyl ether is suitably used.

(Organic Metal Compound)

As the organic metal compound, at least one selected from an organic titanium compound, an organic zirconium compound, and an organic aluminum compound is used. These compounds may be used alone or may be used in combination of two or more thereof.

The organic metal compound has an action to promote the blocking reaction of the isocyanate group owing to the hydrophilic compound (X) of the terminal blocking agent. In particular, the reaction promoting action in the case of terminal blocking with the hydroxy group is large, and it may be presumed that according to this, the aqueous carbodiimide is readily obtained.

As in the steps (1A) to (1D), even in the case of adding the organic metal compound at any stage, the blocking reaction of the isocyanate group can be promoted.

The organic metal compound is preferably a metal alkoxide represented by any one of the following general formulae (1-1) to (1-3).

$$Ti(OR)_4 \qquad (1-1)$$

$$Zr(OR)_4 \qquad (1-2)$$

$$Al(OR)_3 \qquad (1-3)$$

In the formulae (1-1) to (1-3), R's are each independently an alkyl group having 1 to 20 carbon atoms, preferably an alkyl group having 2 or more carbon atoms, and more preferably an alkyl group having 3 or more carbon atoms. The four R's may be the same as or different from each other.

Specifically, examples thereof include tetraisopropyl titanate, tetraisopropyl zirconate, tetra-n-butyl titanate, tetra-n-butyl zirconate, tetraoctyl titanate, tetraoctyl zirconate, tetrastearyl titanate, tetrastearyl zirconate, and aluminum tri-sec-butoxide.

The addition amount of the organic metal compound which is mixed with the isocyanate group-containing carbodiimide (A) in the step (1) is preferably 0.0005 to 15 parts by mass, more preferably 0.0008 to 12 parts by mass, and still more preferably 0.001 to 10 parts by mass as expressed in terms of an amount of metal element contained based on 100 parts by mass of the isocyanate group-containing carbodiimide (A) from the viewpoint that it has favorable crosslinking reactivity with the crosslinking group, such as an alcoholic hydroxy group of the aqueous resin, without causing cloudiness of the aqueous carbodiimide-containing liquid.

In the case where the organic metal compound is added in any one of the steps (1A) to (1E), its addition amount is preferably 0.0005 to 15 parts by mass, more preferably 0.0008 to 12 parts by mass, and still more preferably 0.001 to 10 parts by mass as expressed in terms of an amount of metal element contained based on 100 parts by mass of the polyisocyanate.

(Reaction Temperature)

A reaction temperature for obtaining the terminal-blocked carbodiimide (B) is preferably 20 to 200° C., and preferably 20 to 190° C. from the viewpoint of allowing the blocking reaction of the isocyanate group owing to the terminal blocking agent to stably proceed. Furthermore, from the viewpoint of reaction promotion, the foregoing reaction temperature is preferably 60 to 180° C.

A reaction system in the step (1) may be solventless or may be in a solvent. In the solventless case, the reaction is performed by melting the isocyanate group-containing carbodiimide (A). In addition, in the case of using a solvent, it is preferred to use a solvent capable of dissolving the isocyanate group-containing carbodiimide (A) therein.

In all of the steps (1A) to (1E), the reaction system may be solventless or may be in a solvent. In the case of using a solvent, it is preferred to use a solvent capable of dissolving the polyisocyanate compound therein.

[Step (2)]

In the step (2), the terminal-blocked carbodiimide (B) obtained in the step (1) or any one of the steps (1A) to (1E) is dissolved or dispersed in an aqueous solvent, to obtain an aqueous carbodiimide-containing liquid.

A concentration of the aqueous carbodiimide-containing liquid is not particularly limited, and it is appropriately adjusted according to the use application of the aqueous carbodiimide. The foregoing concentration is typically 10 to 70% by mass, preferably 15 to 60% by mass, and still more preferably 20 to 50% by mass.

EXAMPLES

The present invention is hereunder described in detail by reference to Examples, but it should be construed that the present invention is not limited by these Examples.

Details of raw materials for production of an aqueous carbodiimide-containing liquid of each of the following Examples and Comparative Examples are as follows.

<Polyisocyanate>
HMDI: 4,4'-Dicyclohexylmethane diisocyanate
TMXDI: 1,3-Bis(2-isocyanato-2-propyl)benzene (another name: tetramethylxylene diisocyanate)

<Terminal Blocking Agent>
MPEG (400): Polyethylene glycol monomethyl ether (mass average molecular weight: 400)
MPEG (410): Polyethylene glycol monomethyl ether (mass average molecular weight: 410)
MPEG (550): Polyethylene glycol monomethyl ether (mass average molecular weight: 550)
AA: N,N-Diethyl isopropanolamine (molecular weight: 131)

The mass average molecular weight of each of MPEG's is a catalog value. The mass average molecular weight can also be measured by means of gel permeation chromatography (GPC method).

<Carbodiimidation Catalyst>
3-Methyl-1-phenyl-2-phospholene-1-oxide

<Organic Metal Compound>
T1: Tetraoctyl titanate (molecular weight: 564)
T2: Tetraisopropyl titanate (molecular weight: 284)
T3: Tetrastearyl titanate (molecular weight: 1,126)
Z1: Tetra-n-butyl zirconate (molecular weight: 383)
Al: Aluminum tri-sec-butoxide (molecular weight: 246)

The amount of the terminal isocyanate group before blocking was measured in the following manner, and the polymerization degree of the carbodiimide was calculated from this amount of the terminal isocyanate group.

The carbodiimide before blocking the terminal isocyanate group was mixed with a toluene solution of di-n-butylamine having an already-known concentration, thereby allowing the terminal isocyanate group and the di-n-butylamine to react with each other. The residual di-n-butylamine was subjected to neutral titration with a hydrochloric acid standard solution, and the residual amount [% by mass] of the isocyanate group (terminal isocyanate group amount) was calculated by the potentiometric titration method (used device: automated titration device "COM-900", manufactured by Hiranuma Sangyo Co., Ltd.).

Example 1

Step (1) (Step (1A)):

1,000 g of, as the polyisocyanate, HMDI and 5 g of the carbodiimidation catalyst were charged in a reaction vessel equipped with a reflux tube and a stirrer and stirred in a nitrogen atmosphere at 190° C. for 8 hours (1A-1), to obtain an isocyanate group-containing carbodiimide (A) (polymerization degree: 3). An absorption peak assigned to the carbodiimide group was confirmed at a wavelength of around 2,150 $cm^{-1}$ through the infrared absorption (IR) spectrum measurement (with an infrared spectrophotometer "FT/IR-6100", manufactured by JASCO Corporation; hereinafter the same).

875 g of the above-obtained isocyanate group-containing carbodiimide (A) was melted at 150° C.; 770 g of, as the terminal blocking agent, MPEG (400) (corresponding to 1.01 mols per mol of the isocyanate group of the isocyanate group-containing carbodiimide (A)) and 1.4 g of, as the organic metal compound, T1 (0.014 parts by mass as expressed in terms of an amount of metal element contained based on 100 parts by mass of the isocyanate group-containing carbodiimide (A) (polyisocyanate used) were added; and the contents were heated to 180° C. and allowed to react with each other for 1 hour while stirring (1A-2). With respect to the reaction product, it was confirmed through the IR spectrum measurement that the absorption assigned to the isocyanate group at a wavelength of 2,200 to 2,300 $cm^{-1}$ vanished, to obtain a terminal-blocked carbodiimide (B).

Step (2):

The obtained terminal-blocked carbodiimide (B) was cooled to 70° C., to which was added water, and the resultant was stirred and mixed, to obtain an aqueous carbodiimide-containing liquid having a concentration of 40% by mass.

Examples 2 to 11

Each of aqueous carbodiimide-containing liquids was obtained in the same manner as in Example 1, except that in Example 1, the polyisocyanate, the polymerization degree, the terminal blocking agent, and the addition condition of the organic metal compound were changed to those shown in the following Table 1.

Example 12

Step (1B):
A terminal-blocked carbodiimide (B) was obtained in the same manner as in Example 1, except that in the step (1) of Example 1, the polyisocyanate (HMDI), the carbodiimidation catalyst, and the organic metal compound (T1) were allowed to react with each other at 190° C. for 8 hours (1B-1); and the terminal blocking agent (MPEG (400)) was then added and mixed, and the resulting mixture was allowed to react with each at 180° C. for 1 hour (1B-2).
Step (2):
The obtained terminal-blocked carbodiimide (B) was treated in the same manner as in the step (2) of Example 1, to obtain an aqueous carbodiimide-containing liquid.

Example 13

Step (1C):
1,000 g of, as the polyisocyanate, HMDI, 5 g of the carbodiimidation catalyst, 770 g of, as the terminal blocking agent, MPEG (400), and 1.6 g of, as the organic metal compound, T1 (0.014 parts by mass as expressed in terms of an amount of metal element contained based on 100 parts by mass of the polyisocyanate) were charged in a reaction vessel equipped with a reflux tube and a stirrer and allowed to react with each other in a nitrogen atmosphere at 190° C. for 12 hours while stirring. With respect to the reaction product, it was confirmed through the IR spectrum measurement that the absorption assigned to the isocyanate group at a wavelength of 2,200 to 2,300 cm$^{-1}$ vanished, to obtain a terminal-blocked carbodiimide (B).
Step (2):
The obtained terminal-blocked carbodiimide (B) was treated in the same manner as in the step (2) of Example 1, to obtain an aqueous carbodiimide-containing liquid.

Example 14

Step (1D):
A terminal-blocked carbodiimide (B) was obtained in the same manner as in Example 1, except that in the step (1) of Example 1, the polyisocyanate (HMDI), the terminal blocking agent (MPEG (400)), and the organic metal compound (T1) were allowed to react with each other at 180° C. for 1 hour (1D-1); and the carbodiimidation catalyst was then added and mixed, and the resulting mixture was allowed to react with each other at 190° C. for 12 hours (1D-2).
Step (2):
The obtained terminal-blocked carbodiimide (B) was treated in the same manner as in the step (2) of Example 1, to obtain an aqueous carbodiimide-containing liquid.

Example 15

Step (1E):
A terminal-blocked carbodiimide (B) was obtained in the same manner as in Example 1, except that in the step (1) of Example 1, the polyisocyanate (HMDI) and the terminal blocking agent (MPEG (400)) were allowed to react with each other at 180° C. for 3 hours (1E-1); and the carbodiimidation catalyst and the organic metal compound (T1) were then added and mixed, and the resulting mixture was allowed to react with each other at 190° C. for 12 hours (1E-2).
Step (2):
The obtained terminal-blocked carbodiimide (B) was treated in the same manner as in the step (2) of Example 1, to obtain an aqueous carbodiimide-containing liquid.

Example 16

Step (1) (Step (1A)):
1,000 g of, as the polyisocyanate, HMDI and 5 g of the carbodiimidation catalyst were charged in a reaction vessel equipped with a reflux tube and a stirrer and stirred in a nitrogen atmosphere at 190° C. for 17 hours (1A-1), to obtain an isocyanate group-containing carbodiimide (A) (polymerization degree: 6). An absorption peak assigned to the carbodiimide group at a wavelength of around 2,150 cm$^{-1}$ was confirmed through the IR spectrum measurement.
856 g of the above-obtained isocyanate group-containing carbodiimide (A) was melted at 150° C.; 218 g of, as the terminal blocking agent, MPEG (400) and 72 g of AA (each corresponding to 0.5 mols per mol of the isocyanate group of the isocyanate group-containing carbodiimide (A)) and 1.4 g of, as the organic metal compound, T1 (0.014 parts by mass as expressed in terms of an amount of metal element contained based on 100 parts by mass of the isocyanate group-containing carbodiimide (A) (polyisocyanate used)) were added; and the contents were heated to 180° C. and allowed to react with each other for 1 hour while stirring (1A-2). With respect to the obtained reaction product, it was confirmed through the IR spectrum measurement that the absorption assigned to the isocyanate group at a wavelength of 2,200 to 2,300 cm$^{-1}$ vanished, to obtain a terminal-blocked carbodiimide (B).
Step (2):
The obtained terminal-blocked carbodiimide (B) was treated in the same manner as in the step (2) of Example 1, to obtain an aqueous carbodiimide-containing liquid.

Comparative Example 1

An aqueous carbodiimide-containing liquid was obtained in the same manner as in Example 1, except that in Example 1, the organic metal compound was not added.

Comparative Example 2

An aqueous carbodiimide-containing liquid was obtained in the same manner as in Example 10, except that in Example 10, the organic metal compound was not added.

Comparative Example 3

An aqueous carbodiimide-containing liquid was obtained in the same manner as in Example 1, except that in Example 1, the addition time of the organic metal compound was changed to that in the step (2).

Comparative Example 4

An aqueous carbodiimide-containing liquid was obtained in the same manner as in Example 13, except that in Example 13, the addition time of the organic metal compound was changed to that in the step (2).

[Evaluation of Aqueous Carbodiimide-Containing Liquid]

With respect to each of the aqueous carbodiimide-containing liquids obtained in the aforementioned Examples and Comparative Examples, the reactivity with the alcoholic hydroxy group was evaluated in the following manner. The evaluation results are shown in the following Table 1.

To 100 g of each of the aqueous carbodiimide-containing liquids obtained in the Examples and Comparative Examples, as the compound having an alcoholic hydroxy group, MPEG (400) was added in an equimolar equivalent amount to the carbodiimide group of the aqueous carbodiimide, and the contents were charged in a reaction vessel equipped with a reflux tube and a stirrer and stirred at 120° C. for 90 minutes. In the IR spectrum measurement of the obtained reaction product, the reaction product in which the peak assigned to the carbodiimide group at 2,150 cm$^{-1}$ was decreased, whereas the peak assigned to an isourea structure to be produced owing to a reaction between the carbodiimide group and the alcoholic hydroxy group at 1,660 cm$^{-1}$ was increased by 50% or more as compared with a peak height before the reaction, was judged such that the reactivity with the alcoholic hydroxy group is "Yes".

TABLE 1

| | Polyisocyanate | Polymerization degree | Terminal blocking agent | Organic metal compound Kind | Amount expressed in terms of an amount of metal element contained [parts by mass] (vs. 100 parts by mass of polyisocyanate) | Reaction temperature and time in each step | Reactivity with alcoholic hydroxy group |
|---|---|---|---|---|---|---|---|
| Example 1 | HMDI | 3 | MPEG (400) | T1 | 0.014 | (1A-1) 190° C., 8 hr → (1A-2) 180° C., 1 hr | Yes |
| Example 2 | HMDI | 3 | MPEG (400) | T2 | 0.014 | (1A-1) 190° C., 8 hr → (1A-2) 180° C., 1 hr | Yes |
| Example 3 | HMDI | 3 | MPEG (400) | T3 | 0.014 | (1A-1) 190° C., 8 hr → (1A-2) 180° C., 1 hr | Yes |
| Example 4 | HMDI | 3 | MPEG (400) | Z1 | 0.014 | (1A-1) 190° C., 8 hr → (1A-2) 180° C., 1 hr | Yes |
| Example 5 | HMDI | 3 | MPEG (400) | A1 | 0.014 | (1A-1) 190° C., 8 hr → (1A-2) 180° C., 1 hr | Yes |
| Example 6 | HMDI | 3 | MPEG (400) | T1 | 3.48 | (1A-1) 190° C., 8 hr → (1A-2) 180° C., 1 hr | Yes |
| Example 7 | HMDI | 3 | MPEG (400) | T1 | 7.06 | (1A-1) 190° C., 8 hr → (1A-2) 180° C., 1 hr | Yes |
| Example 8 | HMDI | 3 | MPEG (400) | T1 | 0.001 | (1A-1) 190° C., 8 hr → (1A-2) 180° C, 1 hr | Yes |
| Example 9 | HMDI | 6.5 | MPEG (410) | T1 | 0.014 | (1A-1) 190° C., 8 hr → (1A-2) 180° C., 1 hr | Yes |
| Example 10 | TMXDI | 10 | MPEG (550) | T1 | 0.014 | (1A-1) 190° C. 8 hr → (1A-2) 180° C., 1 hr | Yes |
| Example 11 | TMXDI | 10 | MPEG (550) | T1 | 0.014 | (1A-1) 190° C., 8 hr → (1A-2) 25° C. (room temperature), 8 hr | Yes |
| Example 12 | HMDI | 3 | MPEG (400) | T1 | 0.014 | (1B-1) 190° C., 8 hr → (1B-2) 180° C., 1 hr | Yes |
| Example 13 | HMDI | 3 | MPEG (400) | T1 | 0.014 | (1C) 190° C., 12 hr | Yes |
| Example 14 | HMDI | 3 | MPEG (400) | T1 | 0.014 | (1D-1) 180° C., 1 hr → (1D-2) 190° C., 12 hr | Yes |
| Example 15 | HMDI | 3 | MPEG (400) | T1 | 0.014 | (1E-1) 180° C., 3 hr → (1E-2) 190° C., 12 hr | Yes |
| Example 16 | HMDI | 6 | MPEG (400) AA | T1 | 0.014 | (1A-1) 190° C., 17 hr → (1A-2) 180° C., 1 hr | Yes |
| Comparative Example 1 | HMDI | 3 | MPEG (400) | — | — | (1A-1) 190° C., 8 hr → (1A'-2) 180° C., 1 hr | No |
| Comparative Example 2 | TMXDI | 10 | MPEG (550) | — | — | (1A-1) 190° C., 8 hr → (1A'-2) 180° C., 1 hr | No |
| Comparative Example 3 | HMDI | 3 | MPEG (400) | T1 | (0.014) | (1A-1) 190° C. 8 hr → (1A'-2) 180° C., 1 hr | No |
| Comparative Example 4 | HMDI | 3 | MPEG (400) | T1 | (0.014) | (1C) 190° C., 12 hr | No |

As noted from the evaluation results shown in Table 1, in accordance with the production method of the present invention, an aqueous carbodiimide having excellent reactivity with an alcoholic hydroxy group (crosslinking group) can be obtained.

From this fact, it may be said that the aqueous carbodiimide obtained by the production method of the present invention is also suitably applicable as a crosslinking agent for aqueous resins.

The invention claimed is:

1. A method for producing an aqueous carbodiimide-containing liquid, comprising
    a step (1) of mixing an isocyanate group-containing carbodiimide (A), a terminal blocking agent, and at least one organic metal compound selected from an organic titanium compound, an organic zirconium compound, and an organic aluminum compound and allowing them to react with each other, to obtain a terminal-blocked carbodiimide (B) in which the isocyanate group is blocked with the terminal blocking agent; and
    a step (2) of dissolving or dispersing the terminal-blocked carbodiimide (B) in an aqueous solvent, to obtain an aqueous carbodiimide-containing liquid, wherein
    the terminal blocking agent contains a hydrophilic compound (X) having a functional group having reactivity with the isocyanate group and a hydrophilic group other than the functional group.

2. The method for producing an aqueous carbodiimide-containing liquid according to claim 1, wherein the addition amount of the organic metal compound is 0.0005 to 15 parts by mass as expressed in terms of an amount of metal element contained based on 100 parts by mass of the isocyanate group-containing carbodiimide (A).

3. The method for producing an aqueous carbodiimide-containing liquid according to claim 1, wherein in the step (1), a polyisocyanate and a carbodiimidation catalyst are used in place of the isocyanate group-containing carbodiimide (A).

4. The method for producing an aqueous carbodiimide-containing liquid according to claim 3, wherein after mixing the polyisocyanate and the carbodiimidation catalyst and allowing them to react with each other, the terminal blocking agent and the organic metal compound are added and mixed.

5. The method for producing an aqueous carbodiimide-containing liquid according to claim 3, wherein after mixing the polyisocyanate, the carbodiimidation catalyst, and the organic metal compound and allowing them to react with each other, the terminal blocking agent is added and mixed.

6. The method for producing an aqueous carbodiimide-containing liquid according to claim 3, wherein the polyisocyanate, the carbodiimidation catalyst, the terminal blocking agent, and the organic metal compound are simultaneously mixed and allowed to react with each other.

7. The method for producing an aqueous carbodiimide-containing liquid according to claim 3, wherein after mixing the polyisocyanate, the terminal blocking agent, and the organic metal compound and allowing them to react with each other, the carbodiimidation catalyst is added and mixed.

8. The method for producing an aqueous carbodiimide-containing liquid according to claim 3, wherein after mixing the polyisocyanate and the terminal blocking agent and allowing them to react with each other, the carbodiimidation catalyst and the organic metal compound are added and mixed.

9. The method for producing an aqueous carbodiimide-containing liquid according to claim 3, wherein the polyisocyanate is at least one selected from tetramethylene diisocyanate, hexamethylene diisocyanate, dodecamethylene diisocyanate, 2,2,4-trimethylhexamethylene diisocyanate, 1,4-bis(isocyanatomethyl)cyclohexane, 2,2-bis(4-isocyanatocyclohexl)propane, isophorone diisocyanate, 4,4'-dicyclohexylmethane diisocyanate, 1,3-bis(2-isocyanato-2-propyl)benzene, toluene-2,4-diisocyanate, 2,2'-diphenylmethane diisocyanate, 2,4'-diphenylmethane diisocyanate, 4,4'-diphenylmethane diisocyanate, 2,4,6-triisopropylbenzene-1,3-diyl diisocyanate, triphenylmethane triisocyanate, biphenyl-2,4,4'-triisocyanate, and 1,6,11-undecane triisocyanate.

10. The method for producing an aqueous carbodiimide-containing liquid according to claim 3, wherein the addition amount of the organic metal compound is 0.0005 to 15 parts by mass as expressed in terms of an amount of metal element contained based on 100 parts by mass of the polyisocyanate.

11. The method for producing an aqueous carbodiimide-containing liquid according to claim 1, wherein in the terminal-blocked carbodiimide (B), all of the terminal isocyanate groups are blocked with the hydrophilic compound (X).

12. The method for producing an aqueous carbodiimide-containing liquid according to claim 1, wherein the terminal-blocked carbodiimide (B) contains one in which one or more of the terminal isocyanate groups in one molecule are blocked with the hydrophilic compound (X), and one or more of the remaining isocyanate groups are blocked with a compound other than the hydrophilic compound (X).

13. The method for producing an aqueous carbodiimide-containing liquid according to claim 1, wherein the organic metal compound is a metal alkoxide represented by any of the following general formulae (1-1) to (1-3):

$$Ti(OR)_4 \quad (1-1)$$

$$Zr(OR)_4 \quad (1-2)$$

$$Al(OR)_3 \quad (1-3)$$

wherein R's are each independently an alkyl group having 1 to 20 carbon atoms.

14. The method for producing an aqueous carbodiimide-containing liquid according to claim 1, wherein the hydrophilic compound (X) is a polyalkylene glycol monohydrocarbyl ether.

15. The method for producing an aqueous carbodiimide-containing liquid according to claim 1, wherein a reaction temperature in the step (1) is 20 to 200° C.

* * * * *